(12) United States Patent  
Bluhm

(10) Patent No.: US 7,721,864 B2
(45) Date of Patent: May 25, 2010

(54) ROTATIONAL COUPLING DEVICE WITH SEALED KEY

(75) Inventor: Brenton Charles Bluhm, Helenville, WI (US)

(73) Assignee: Warner Electric Technology LLC, Braintree, MA (US)

( * ) Notice: Subject to any disclaimer, the term of this patent is extended or adjusted under 35 U.S.C. 154(b) by 221 days.

(21) Appl. No.: 12/124,699

(22) Filed: May 21, 2008

(65) Prior Publication Data

US 2009/0289450 A1 Nov. 26, 2009

(51) Int. Cl.
*F16D 25/0638* (2006.01)

(52) U.S. Cl. .................... 192/85.24; 192/112; 277/630; 277/641

(58) Field of Classification Search .................... 277/912
See application file for complete search history.

(56) References Cited

U.S. PATENT DOCUMENTS

| | | | |
|---|---|---|---|
| 3,599,990 A | 8/1971 | Greiner et al. | |
| 3,743,302 A | 7/1973 | Bach et al. | |
| 3,910,587 A * | 10/1975 | Loeffler et al. | 277/401 |
| 4,126,058 A * | 11/1978 | Shelby et al. | 192/112 |
| 4,549,740 A | 10/1985 | Nutter | |
| 4,900,039 A * | 2/1990 | Klecker et al. | 277/320 |
| 5,385,351 A | 1/1995 | White | |
| 5,489,105 A | 2/1996 | Attenasio et al. | |
| 5,662,462 A | 9/1997 | Paley et al. | |
| 6,047,969 A | 4/2000 | Hoefft et al. | |
| 6,364,605 B1 | 4/2002 | Lutes | |
| 6,386,545 B1 | 5/2002 | Evans | |
| 6,719,294 B2 | 4/2004 | Nguyen et al. | |
| 6,848,690 B1 * | 2/2005 | Hunter | 277/596 |
| 2003/0015841 A1 | 1/2003 | Rowe | |
| 2003/0034615 A1 | 2/2003 | Diana | |

FOREIGN PATENT DOCUMENTS

| | | |
|---|---|---|
| DE | 1 200 080 | 9/1965 |
| DE | 198 50 132 A1 | 6/1999 |
| DE | 10 2007 009 964 A1 | 9/2007 |

OTHER PUBLICATIONS

International Search Report issued in corresponding international application PCT/US09/044679 (Nov. 4, 2009).
Written Opinion issued in corresponding international application PCT/US09/044679 (Nov. 4, 2009).

\* cited by examiner

*Primary Examiner*—Rodney H Bonck
(74) *Attorney, Agent, or Firm*—Dykema Gossett PLLC

(57) ABSTRACT

A fluid actuated rotational coupling device is provided with improved sealing of fluid passages. The device includes a fluid actuated rotational coupling that is disposed on a rotatable shaft. The coupling defines a fluid port. A key is received within a keyway in the coupling and/or shaft and defines a fluid passage extending therethrough having fluid ports at either end aligned with the fluid port in the coupling and a fluid port in the shaft. The key also defines grooves formed in surfaces of the key and surrounding the fluid ports. Seals are disposed within the grooves in the key. By locating the fluid passage and seals in the key, the seals may be removed and replaced without removing the coupling from the shaft. Further, the seals are less likely to be damaged during installation of the coupling device on the shaft.

15 Claims, 2 Drawing Sheets

ROTATIONAL COUPLING DEVICE WITH SEALED KEY

BACKGROUND OF THE INVENTION

1. Field of the Invention

This invention relates to rotational coupling devices such as brakes and clutches and, in particular, to a fluid-actuated rotational coupling device in which fluid is provided from a shaft to the coupling through a sealed key.

2. Discussion of Related Art

Rotational coupling devices such as clutches and brakes are used to control transfer of torque between rotational bodies such as rotatable shafts. Conventional coupling devices can be actuated in a variety of ways including through electromagnetic actuation and fluid actuation. In fluid actuated devices, fluid may be provided to the device through hoses connected to fluid ports. Alternatively, fluid may be provided to the device through fluid passageways in a shaft on which the device is mounted. In the latter case, the fluid connection between the shaft and coupling device must be sealed. In conventional systems, grooves have been machined in the shaft or and device proximate the fluid connection to permit seals to be placed therein. Alternatively a pair of seals may be wrapped around the shaft on either side of the fluid connection. Because the seals must be periodically replaced, these conventional arrangements have several disadvantages. First, removal and replacement of the seals requires disassembly of the coupling device from the shaft. Second, the seals are subject to possible damage as the coupling device is installed on the shaft.

The inventor herein has recognized a need for a rotational coupling device that will minimize and/or eliminate one or more of the above-identified deficiencies.

SUMMARY OF THE INVENTION

The present invention provides a rotational coupling device.

A rotational coupling device in accordance with the present invention includes a fluid-actuated rotational coupling configured to be received on, and to control torque transfer from or to, a shaft rotatable about a first axis. The coupling defines a fluid port. The device further includes a key configured to be received within a keyway formed in at least one of the rotational coupling and the shaft. The key defines a fluid passage extending therethrough having fluid ports at either end aligned with the fluid port in the rotational coupling device and a fluid port in the shaft. The key defines a groove formed in a surface of the key and surrounding one of the fluid ports in the key. The device further includes a seal disposed within the groove.

A rotational coupling device in accordance with the present invention represents an improvement over conventional devices. By locating the seals in the key, the seals may be removed and replaced without removing the coupling device from the shaft. Further, the seals are less likely to be damaged during assembly of the device on the shaft.

These and other advantages of this invention will become apparent to one skilled in the art from the following detailed description and the accompanying drawings illustrating features of this invention by way of example.

DETAILED DESCRIPTION OF EMBODIMENTS OF THE INVENTION

Figure 1:
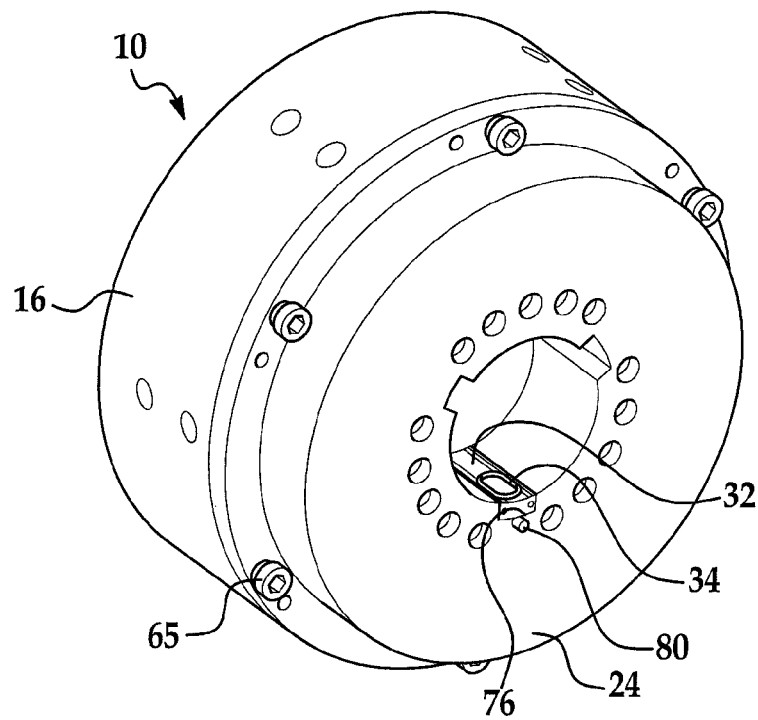
FIG. 1 is a perspective view of a rotational coupling device in accordance with the present invention.
Figure 2:
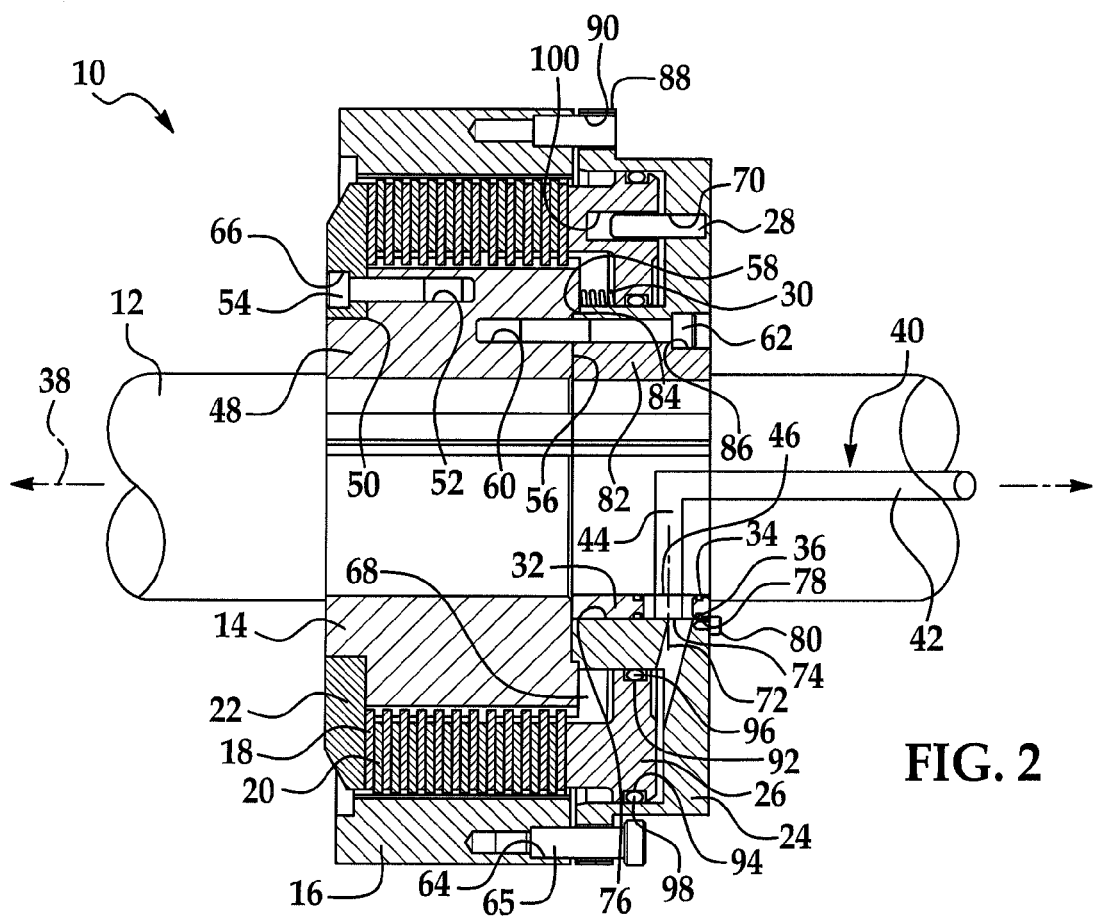
FIG. 2 is a cross-sectional view of a rotational coupling device in accordance with the present invention.

Referring now to the drawings wherein like reference numerals are used to identify identical components in the various views, FIGS. 1-2 illustrate a rotational coupling device 10 in accordance with the present invention. Device 10 functions as a clutch or brake to transfer torque between rotational bodies. In the illustrated embodiment, device 10 functions as a clutch to transfer torque from a driving shaft 12 (see FIG. 2) to a rotating body (not shown) such as a driven shaft. Device 10 may include a hub 14, a ring 16, friction discs 18, 20, a back plate 22, a housing 24, a piston 26, dowels 28, springs 30, a key 32, and seals 34, 36.

Referring to FIG. 2, device 10 is configured to be received on, and to control torque transfer to or from, shaft 12. Shaft 12 is disposed about a rotational axis 38. Shaft 12 defines a fluid passageway 40 through which pneumatic and/or hydraulic fluid may be provided to device 10. The fluid passageway 40 may include an axially extending passage 42 connected to a radially extending passage 44 that terminates in a fluid port 46 on a radially outer surface of shaft 12.

Hub 14 is provided to transfer torque from shaft 12 and also provides structural support to other components of device 10 including friction discs 18. Hub 14 is annular in shape and is disposed about shaft 12 and axis 38. Hub 14 may be affixed to shaft 12 through an interference fit. Hub 14 has a reduced diameter portion 48 at one end defining a shoulder 50 configured to receive plate 22. Hub 14 further defines a plurality of axially extending apertures 52 configured to receive fasteners 54 coupling plate 22 to hub 14. At an opposite axial end, hub 14 defines an annular recess 56 in the radially inner portion of the axial end face of hub 14 which defines a shoulder 58 configured to receive housing 24. Hub 14 may further define a plurality of axially extending apertures 60 configured to receive fasteners 62 coupling housing 24 to hub 14.

Ring 16 is provided to transfer torque to a driven rotational body (not shown) such as a driven shaft and also provides structural support to other components of device 10 including friction discs 20. Ring 16 is annular in shape and is disposed radially outwardly of hub 14. Ring 16 may be affixed to the driven rotational body using an adapter (not shown). Ring 16 defines a plurality of apertures 64 at one axial end configured to receive fasteners such as screws 65 that may be used to couple housing 24 to ring 16 and permit torque transfer in the even of a mechanical failure of device 10.

Friction discs 18, 20 are provided to transmit torque between hub 14 and ring 16. Discs 18, 20 are conventional in the art and may be made from conventional metals and metal alloys. Discs 18 may include a plurality of splines on a radially inner periphery configured to mate with mating splines formed on a radially outer surface of hub 14. Similarly, discs 20 may include a plurality of splines on a radially outer periphery configured to mate with mating splines formed on a radially inner surface of ring 16. Discs 18, 20 may be biased apart by springs (not shown).

Plate 22 provides a reaction plate when discs 18, 20 are compressed by piston 26. Plate 22 may be made from conventional metals and metal alloys. Plate 22 is annular in shape and is supported on portion 48 of hub 14 against shoulder 50.

Plate 22 is further coupled to hub 14 by fasteners 54 extending through apertures 66 in plate 22 and aligned apertures 52 in hub 14.

Housing 24 defines fluid chambers and passageways configured to transmit fluid pressure for actuation of device 10. Housing 24 also provides structural support to various components of device 10 including piston 26. Housing 24 may be made from conventional metals and metal alloys. Housing 24 is annular and may be disposed about shaft 12 and axis 38. Housing 24 defines an annular recess in one axial end face that defines a fluid chamber 68 in which piston 26 is disposed. A plurality of axially extending closed bores 70 in the bottom of chamber 68 are configured to receive dowels 28 used to align piston 26 within chamber 68. Housing 24 also defines a fluid passageway 72 that extends between a fluid port 74 and chamber 68. Passageway 72 extends substantially radially between fluid port 74 and chamber 68. In the illustrated embodiment, the fluid port 74 is formed in a keyway 76 formed in housing 24. The keyway 76 is configured to receive key 32. Housing 24 defines a bore 78 in an axial end face of housing 24 radially outwardly of keyway 76. Bore 78 is configured to receive a fastener 80 used to retain key 32 in position upon assembly. A radially inner portion 82 of housing 24 defines a shoulder 84 configured to engage shoulder 58 in hub 14. Portion 82 also defines a plurality of through bores 86 configured to receive fasteners 62 that couple housing 24 to hub 14. A radially outer portion or flange 88 of housing 24 also defines a plurality of through bores 90 configured to receive fasteners (not shown) that may be used to couple housing 24 to ring 16 to permit torque transfer in the even of a mechanical failure of device 10.

Piston 26 is provided to compress discs 18, 20 when fluid is provided to chamber 68 to permit transfer of torque from shaft 12 to the driven rotational body (not shown). Piston 26 is annular in construction. Piston 26 defines one or more grooves 92, 94 in radially inner and outer surfaces of piston 26 configured to receive seals 96, 98 used to prevent fluid from escaping from chamber 68. Piston 26 also defines a plurality of closed bores 100 in one axial end face. Each bore 100 is configured to receive one end of a corresponding dowel 28.

Dowels 28 are provided to align piston 26 within housing 24. Dowels 28 may be made from conventional metals and metal alloys. Dowels are disposed within aligned bores 70, 100 in housing 24 and piston 26.

Springs 30 are provided to bias piston 26 away from discs 18, 20 to thereby prevent transfer of torque from shaft 12 to the driven rotatable body. Springs 30 are conventional in the art. Springs 30 are disposed between hub 14 and piston 26.

Figure 3:
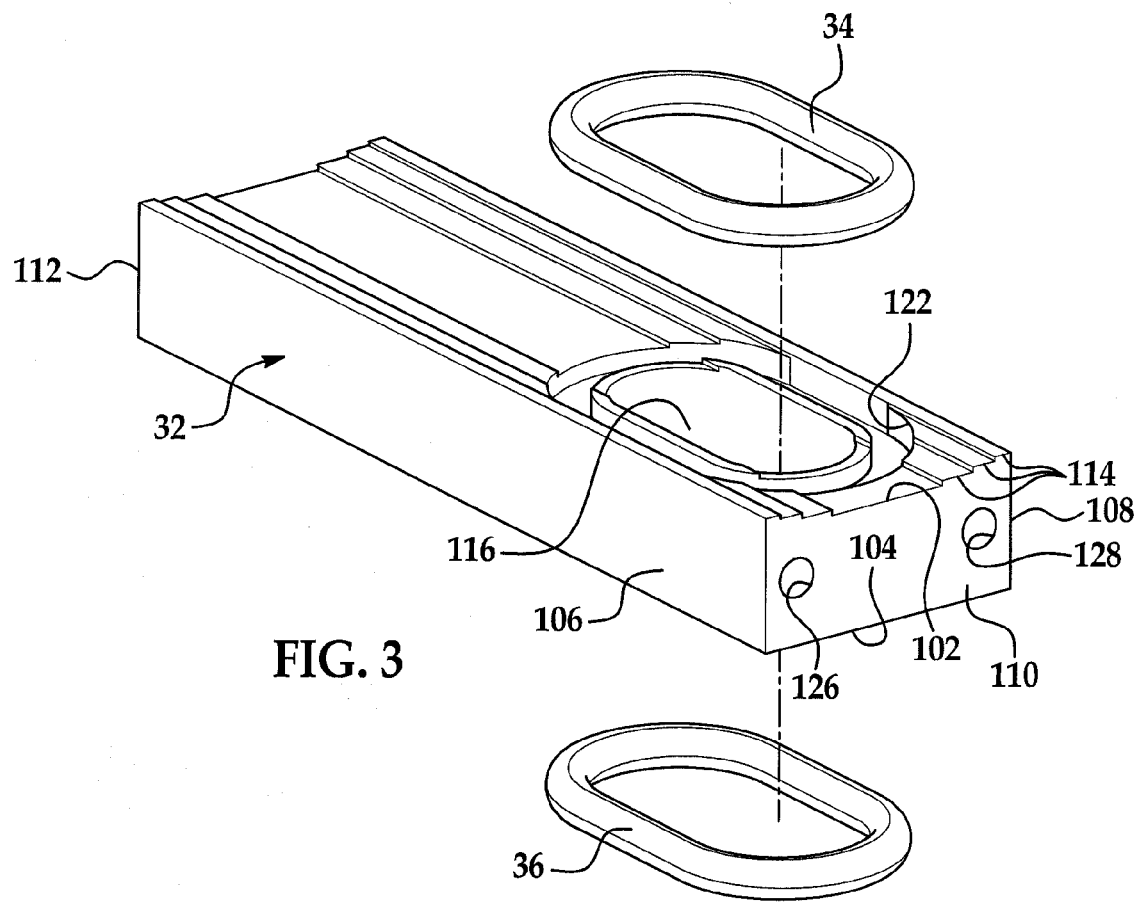
FIG. 3 is a perspective view of the key and seals of the device shown in FIGS. 1-2.
Figure 4:
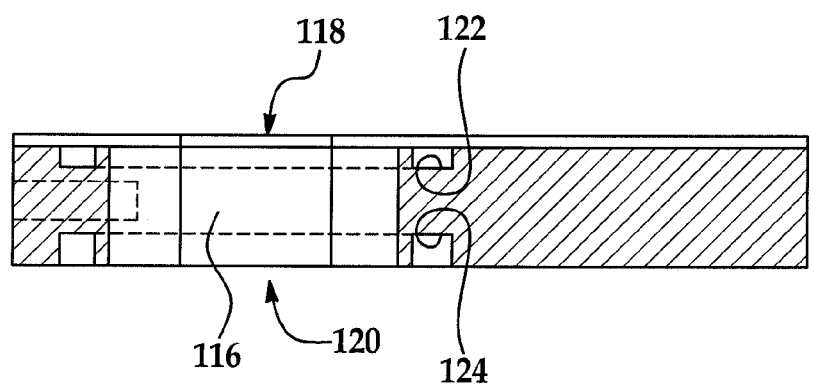
FIG. 4 is a cross-sectional view of the key shown in FIG. 3.

Key 32 is provided to house seals 34, 36 and permit passage of fluid between shaft 12 and coupling 10. Key 32 is disposed within keyway 76 in housing 24 between shaft 12 and housing 24 of coupling 10. Referring to FIGS. 3 and 4, key 32 is substantially rectangular in shape. Key 32 defines radially inner and outer surfaces 102, 104 and a plurality of side walls or surfaces 106, 108, 110, 112 extending therebetween. Outer surface 104 is substantially uniform and engages the bottom wall of keyway 76 in housing 24. Inner surface 102 defines a plurality of steps 114 such that the depth of key 32 increases moving from the center of key 32 to either end of key 32 at side surfaces 106, 108. The changing depth permits key 32 to better conform to the surface of shaft 12. In the illustrated embodiment, key 32 defines three steps 114 moving outwardly from the center key 32 with the width of each step 114 decreasing moving from the center outward to the ends of key 32 at surfaces 106, 108. It should be understood, however, that the number of steps 114 and shape of steps 114 can be varied without departing from the spirit of the present invention. Key 32 defines a fluid passageway 116 extending therethrough between fluid ports 118, 120. In the illustrated embodiment, fluid passageway 116 extends radially and fluid ports 118, 120 are radially aligned. It should be understood, however, that passageway 116 could take a variety of paths through key 32 and, therefore, that ports 118, 120 could be arranged in a plurality of locations on surfaces 102, 104, 106, 108, 110, 112. Ports 118, 120 are aligned with fluid ports 46, 74 in shaft 12 and housing 24, respectively. Key 32 also defines a groove 122, 124 in each of surfaces 102, 104 surrounding ports 118, 120. It again should be understood that the location of grooves 122, 124 will be dictated, however by the location of ports 118, 120 on key 32. In the illustrated embodiment, passageway 116, ports 118, 120, and grooves 122, 124 are substantially oval in shape for a purpose described hereinbelow. It should be understood, however, that the shape of these structures could vary without departing from the spirit of the present invention. Side surface or wall 110 defines a pair of apertures 126, 128 configured to receive a tool (not shown) used to withdraw key 32 from keyway 76 to permit removal and replacement of seals 34, 36.

Seals 34, 36 are provided to prevent fluid from leaking as it passes from shaft 12 through key 32 to housing 24 of coupling 10. Seals 34, 36 are configured to be received within grooves 122, 124 in key 32 and may comprise O-ring seals. Seals 34, 36 may be substantially oval in shape. The oval shape of seals 34, 36 permits some misalignment of fluid ports 118, 120 in key 32 and fluid ports 46 and 74 in shaft 12 and housing 24. It should be understood, however, that the shape of seals 34, 36 could vary without departing from the spirit of the present invention.

A rotational coupling device in accordance with the present invention is advantageous relative to conventional fluid-actuated coupling devices in which fluid is provided through a shaft on which the coupling is mounted. By locating the seals 34, 36 in the key 32, the seals 34, 36 may be removed and replaced without removing the coupling device 10 from the shaft 12. Further, the seals 34, 36 are less likely to be damaged during assembly of the device 10 on the shaft 12.

While the invention has been shown and described with reference to one or more particular embodiments thereof, it will be understood by those of skill in the art that various changes and modifications can be made without departing from the spirit and scope of the invention.

I claim:

1. A rotational coupling device, comprising:
 a fluid-actuated rotational coupling configured to be received on, and to control torque transfer from or to, a shaft rotatable about a first axis, said coupling defining a fluid port;
 a key configured to be received within a keyway formed in at least one of said rotational coupling and said shaft, said key defining a fluid passage extending therethrough having fluid ports at either end aligned with said fluid port in said rotational coupling device and a fluid port in said shaft, said key defining a first groove formed in a first surface of said key and surrounding one of said fluid ports in said key; and,
 a first seal disposed within said first groove.

2. The rotational coupling device of claim 1 wherein said coupling includes:
 a hub configured to be received on said shaft;
 a ring disposed radially outwardly of said hub;
 a first disc coupled to said hub and extending radially outwardly therefrom;
 a second disc coupled to said ring and extending radially inwardly therefrom; and, a piston configured to urge said first and second discs into engagement responsive to fluid pressure received through said fluid port in said rotational coupling.

3. The rotational coupling device of claim 2 wherein said coupling further includes an annular housing configured to be received on said shaft and coupled to said hub, said housing defining an annular fluid chamber in which said piston is disposed, said housing further defining a fluid passageway extending between said fluid port in said rotational coupling device and said fluid chamber.

4. The rotational coupling device of claim 3 wherein said coupling further includes a dowel extending into aligned recesses in said housing and said piston.

5. The rotational coupling device of claim 3 wherein said coupling further includes a spring disposed between said hub and said piston, said spring biasing said piston away from said first and second discs.

6. The rotational coupling device of claim 1 wherein said keyway is formed in said rotational coupling.

7. The rotational coupling device of claim 1 wherein said fluid port of said one of said rotational coupling and said shaft is formed in said keyway.

8. The rotational coupling device of claim 1 wherein said fluid passageway extends radially through said key.

9. The rotational coupling device of claim 1 wherein said fluid ports of said key are formed in radially inner and radially outer surfaces of said key.

10. The rotational coupling device of claim 9 wherein said fluid ports of said key are radially aligned.

11. The rotational coupling device of claim 1 wherein a depth of said key varies from a minimum depth at a center of said key to a maximum depth at each end of said key.

12. The rotational coupling device of claim 1 wherein a radially inner surface of said key defines a plurality of steps.

13. The rotational coupling device of claim 1, further comprising a second seal wherein said key defines a second groove formed in a second surface of said key and surrounding another of said fluid ports in said key and said second seal is disposed within said second groove.

14. The rotational coupling device of claim 13 wherein said first and second surfaces comprise radially inner and outer surfaces of said key.

15. The rotational coupling device of claim 1 wherein said first seal is substantially oval in shape.

* * * * *